March 4, 1952 — C. USCHMANN — 2,587,930
METHOD OF AND APPARATUS FOR EXTRUDING
Filed July 30, 1947 — 2 SHEETS—SHEET 1
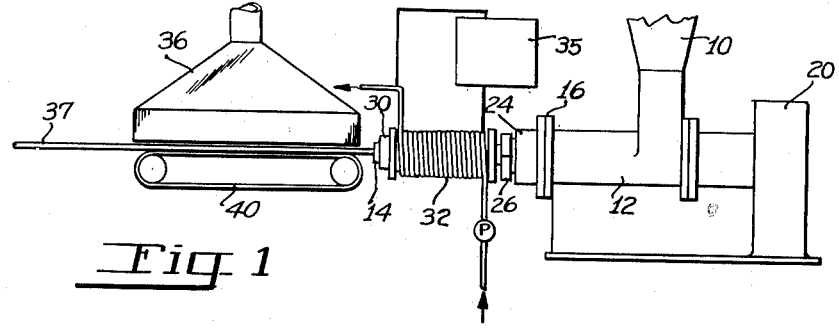
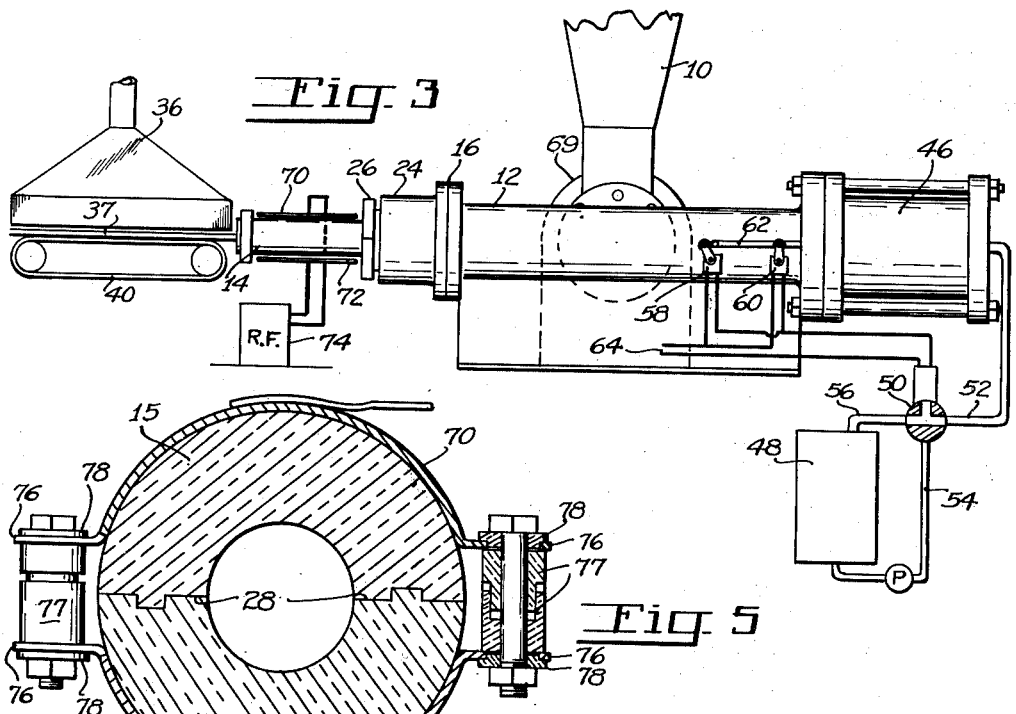
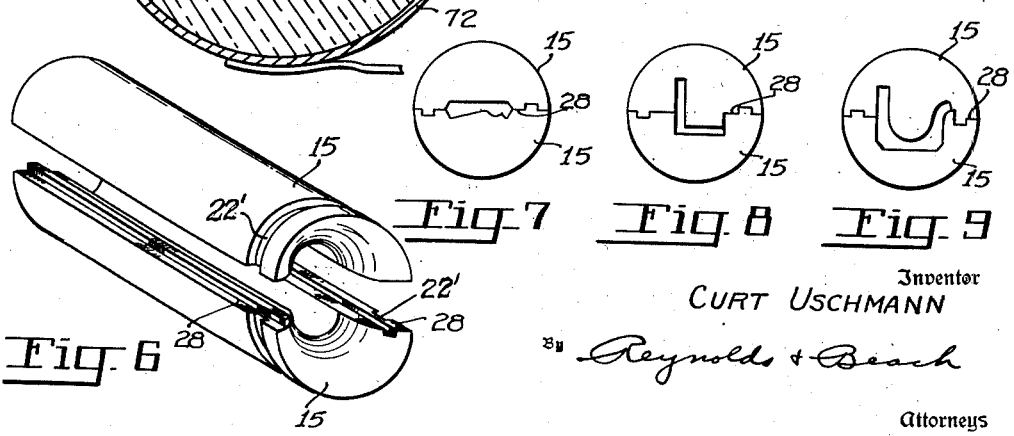
Inventor
CURT USCHMANN
By Reynolds & Beach
Attorneys

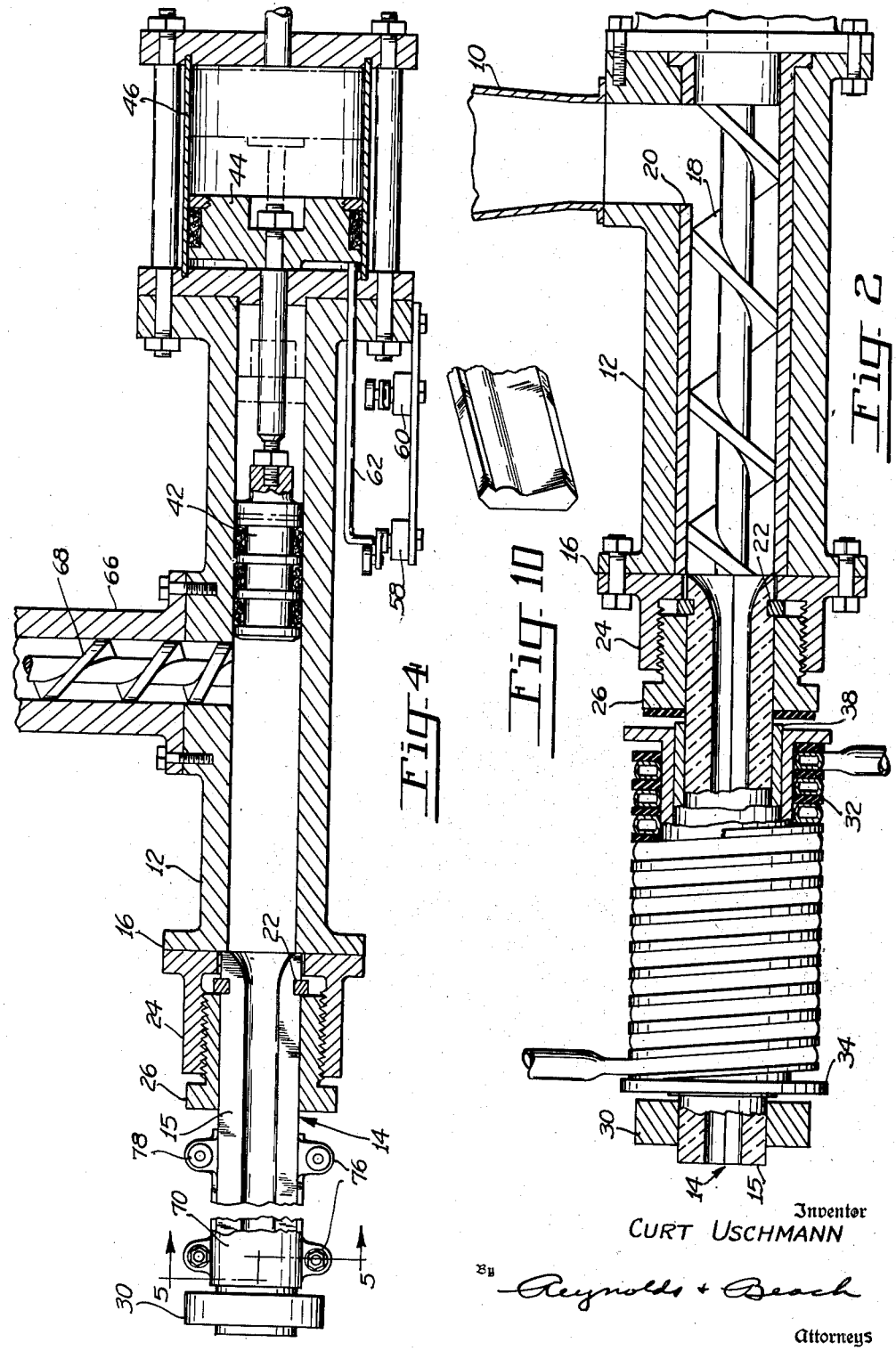

Patented Mar. 4, 1952

2,587,930

UNITED STATES PATENT OFFICE 2,587,930

METHOD OF AND APPARATUS FOR EXTRUDING

Curt Uschmann, Lebanon, Oreg., assignor to Cascades Plywood Corporation, Portland, Oreg., a corporation of Delaware Application July 30, 1947, Serial No. 764,637

10 Claims. (Cl. 18—12)

The present invention is directed to the manufacture of extruded moldings of ligno-cellulose fibers mixed with a thermo-active binder, or similar materials which may be extruded while in plastic condition and simultaneously cured, at least partially, by heat application. The invention consists of the article, the method for producing it and apparatus for carrying out the method.

Methods are well known for comminuting or defiberizing woody matter for such industrial purposes as the production of synthetic lumber, as are techniques for manufacturing products of this nature. In order primarily to complement the various synthetic lumber building products already used as wallboard, siding and the like, the present invention provides suitable moldings and their manufacturing techniques, which moldings will match in appearance and qualities such lumber products. To my knowledge no one has heretofore proposed the use of such moldings or provided suitable means for their manufacture; consequently my invention embraces such articles themselves as new products, as well as the novel method and apparatus for their manufacture.

It is an object of my invention to use in the fiber mixture extruded a heat reactive binder which will set sufficiently rapidly under heat so that the article may be handled substantially immediately after its extrusion.

Another object of my invention is to provide an improved method of manufacturing molded articles of selected shapes, which includes the step of extruding the mixture of woody fibers and thermo-active binder through an elongated die of appropriate shape, and heating the mixture during such extrusion, such as by means of the dielectric heating effect of a high frequency field, to activate or set the binder, enabling the product to be handled after it leaves the die with minimum danger of impairment to such product.

A further object of the invention is to provide extrusion type molding apparatus capable of carrying out the method automatically to produce moldings of the character specified above without defects therein caused by lack of adequate or uniform pressure employed in the process of extruding the plastic material from the apparatus. A related object is to provide such apparatus which will avoid tendencies to form air-pockets or similar causes of nonuniformities in the manufactured article by keeping filled with material at all times the compression chamber from which the material is forced through the die. In achieving the last-mentioned object, I provide novel extrusion apparatus which operates on the principle of a plunger reciprocating back and forth in a compression chamber to force molding material from such chamber through a die communicating with one of its ends. Great pressure may be applied by the plunger to compress the molding material and force its extrusion uniformly through the die.

A principal feature of the apparatus is the manner of introducing the material into the compression chamber to prevent air pockets or voids, and of effecting movement of the plunger by injecting the material into the chamber at a point ahead of the plunger and beyond which the plunger never passes in its forward, compressing movement. By allowing the force of the injected material as it accumulates in the cylinder to force the plunger rearwardly to its starting position preparatory to the succeeding compression stroke, the chamber space next to the die and ahead of the plunger is kept always completely filled with material. Preferably a feeder screw is employed as the means of injecting the material into the chamber. As a related feature of the apparatus, the piston movement is limited both ways and its travel reversed automatically by electrical switching mechanism.

Still another feature of the apparatus is a novel die possessing the necessary hardness and strength while having qualities enabling it to function coactively with high-frequency heating electrode means associated with the die to heat the material during the process of its extrusion through the die. To this end, I provide a die which is heat resistant and capable of passing an electric field extending from accompanying electrodes through the body of material occupying the bore of the die. Moreover, the die is of such construction that dies may readily be replaced or interchanged with others of different configuration.

These and other features and aspects of the invention will be set forth in detail in the following description, taken with the accompanying drawings.

Figure 1 is a side elevation view of one form of apparatus capable of carrying out the steps of the method, and Figure 2 is a fragmentary sectional view taken from the side, of the principal functional parts of such apparatus.

Figure 3 is a side elevation view of different novel apparatus constituting a principal phase of the invention, also capable of producing moldings of the type specified; and Figure 4 is a fragmentary sectional view of the main functional components of such apparatus.

Figure 5 is a sectional view taken along the line 5—5 of Figure 4, of an extrusion die and coacting electrodes used in the apparatus of Figures 3 and 4.

Figure 6 is a perspective view of the body of the die used in both forms of apparatus, showing the parts in separated relation, and Figures 7, 8, and 9 are end views of die inserts having different molding patterns.

Figure 10 is a perspective view of a section of molding of a shape that would be produced by a die such as shown in Figure 7 used in my apparatus.

The fiber materials to be used in the method may be derived from passing a woody material through a suitable grinder to attain the desired degree of fineness of the resulting fibers. Preferably during the final grinding operation, the material is mixed with a suitable binder according to known practice. In this description when the term "woody fibrous material," "ligno-cellulose fibers" or similar terms are employed, the intended connotation is that such fibers or materials may be produced by defiberizing or comminuting wood or any woody substances such as bagasse, cornstalks or the like to produce ligno-cellulose fibers such as those now used in manufacturing various types of fiberboard. Moreover, whenever a "binder" is referred to it will be understood that various binders of the heat-reactive or thermo-active types, which will cooperate with such fibrous material to form a consolidated product, may be used. Examples are phenol or aldehyde resins, or pure lignin, singly or in combinations. As previously mentioned an object is to provide moldings which in appearance and other qualities match existing or available fiberboard or artificial lumber products, so that the fibers and binder selected for the novel article in a particular case may be the same as those used in the manufacture of the fiberboard to be matched if desired.

As a second step the fiber and resin mixture is compressed preliminarily or in conjunction with the following step of forcing the mixture through an extrusion die. While the mixture is under great pressure in passing through the die it is heated to activate or set the binder substance, so that upon emerging from the die the article is or will become fairly rigid, enabling it to be handled shortly thereafter. If desired, the entire curing or setting process may be completed by heat applied while the material is in the die, or, alternatively, it may at that time be carried to a point only sufficiently far to enable the article readily to be moved to other points of operation where the curing process may be completed. In either case, the article, as it emerges from the die, or shortly thereafter, is to be made sufficiently rigid by curing, that it will not disintegrate or lose its form.

Heating the material is preferably effected by use of a high frequency electric field passed through the body of the mixture in the die to heat it uniformly throughout. The amount of heat applied to the material in the die and its distribution will depend upon the materials used, the moisture content of the mixture, the amount of heat required to activate the binder, the extruding speed and pressure, the length of the die, and the degree of completeness of curing desired while the material is being extruded.

The method lends itself readily to being carried out continuously, so long as material is supplied to the compression chamber, or intermittently, and the molded product emerging from the die may be cut into the desired lengths by a suitable saw or cutter stationed at the exit of the die. Dies practically of any shape may, of course, be employed to form the desired articles.

The product resulting from the foregoing method, will have the appearance and most of the general properties of synthetic boards produced from similar raw materials by other known methods. They may be in the form of corner molding, roof gutter, quarter round, or any of a variety of practical structural and ornate shapes in cross section. Moreover, since the raw materials making up the product may be secured relatively cheaply, and its surfaces are finished in the single operation of extrusion through the die, these synthetic products offer a desirable substitute for natural lumber moldings. As previously stated there is also much to be said for their outward appearance when used as trimming, in matching the appearance of synthetic lumber wallboards or siding now in use.

Various aspects of the method previously described will now be presented further in the following description of apparatus adapted to carry out steps of the method.

In Figure 1, the mixture of fibers and binder is fed from a hopper 10 into a compression chamber indicated generally at 12, where the mixture is compressed and forced through an elongated die 14 adjoining the end of the compression chamber at 16. As shown best in Figure 2, the compression chamber comprises an internally sleeved tube receiving a conveyor screw 18 which may be driven by any suitable means, such as by a variable speed geared motor indicated generally at 20 in Figure 1. Material dropping from the hopper 10 into the chamber falls into the space between ribs of the conveyor screw 18 to be carried forward by it in the chamber to the adjoining throat or entrance of the die 14. The sleeve 20 inserted in the compression chamber tube is designed to fit the conveyor screw, and it may be replaced when there is appreciable wear of either.

The body of the die, preferably comprising an elongated tube 14, as also shown in Figure 2, formed in two separate longitudinal sections diametrically separated, 15 (Figure 6), is grooved annularly at its receiving end adjoining the tube 12, as indicated at 22', to receive a split locking ring 22 thicker than the depth of the groove. One side of that portion of the ring which projects from the groove is adapted to bear against the inwardly projecting shoulder of an internally threaded flanged sleeve 24, secured by bolts 16 to a flange on the end of the tube 12. The other side of the locking ring is abutted by the inner end of a threaded bushing 26 screwed into sleeve 24. By this construction, tightening the bushing 26 against the locking ring 22 acts to hold the die against longitudinal displacement, yet permits interchanging dies readily simply by removing the bushing.

The two semicylindrical die segments, which have complemental tongues and grooves extending longitudinally at their opposite interfaces to insure their assembly in exact registry, as indicated at 28 in Figure 6, are kept from being separated by the pressure exerted by the mixture within the die, both by the bushing 26 encircling the inner end of the die and by a collar 30 which is slipped over and fits snugly on the outer end of the die. Such collar also serves to maintain in position an inductive heating element 32 comprising a tubular coil wrapped around a spool 34 encircling the die, and connected to a high-frequency energy source 35. The die may be of steel or other suitable electrically conductive material capable of becoming inductively heated, or the die may be of material highly resistant to abrasion and closely encircled by an inductively heated sleeve. If a ceramic die is employed, for example, induction heating may then occur by losses in a carbon or steel sleeve associated with the die for that purpose. The coil 32 may be cooled by circulating water through the tube forming the coil, and may be heat-insulated from the die by an insulating sleeve 38.

Broadly, as to the method, the heating element associated with the die may comprise any suitable means, such as the inductive coil shown, or a resistance wire, by which the heat is transmitted through the die body to the mixture within. Alternatively, as will be discussed in connection with a later described form of apparatus, the heating element may comprise high-frequency electrodes positioned and appropriately energized to establish the high frequency electric field through the body of the die and the mixture within it, to heat the mixture dielectrically, as in the case of Figure 4.

I may modify somewhat the structure of Figure 2 in order separately to heat-insulate the die from the compression chamber 12, or, indeed, I may leave it without added insulation, as shown, to enable preheating the material before it reaches the die in the illustrated case, by virtue of heat conducted from the die to the body of the compression chamber. In case dielectric heating is employed, as later described, the body of the die, being formed of insulating or dielectric material, may be more or less self-insulated against transfer of heat from it to the body of the compression chamber.

In the operation of the device of Figures 1 and 2, material dropping from the hopper 10 into the compression chamber 12 and between the ribs of the conveyor is carried forwardly in the chamber towards the die. As it approaches the die it becomes packed firmly, finally being forced into the tapered throat of the die to become heated during extrusion. Upon emerging from the die the molded stock preferably is carried on a belt 40 passing beneath a protective cooling hood 36 to prevent chilling and to prolong the curing period.

When greater pressures are required for extruding the material than those obtainable by the device of Figure 2, and generally for more positive operation, I prefer to employ the mechanism shown illustratively in Figures 3 and 4. While in the device of Figure 2 the extrusion pressure is limited by the capacity of the conveyor screw 18 to compress the material and force it through the die, the device of Figure 4 admits of much greater compressive action because of the use of a reciprocating plunger by which very great extrusion pressure may be exerted on the material, depending upon the driving means connected to the plunger. If the consistency of the material, or its resistance to flow under pressure, is assumed to be constant, then the pressure required to be exerted by the plunger to force the extrusion in any case, assuming such pressure to be applied evenly by steady movement of the plunger, is approximately directly related to the ratio of the respective apertures of the compression chamber, and the cross-sectional areas and lengths of cross-sectional outlines of the die bore.

For a given rate of extrusion, the greater the aperture area of the die bore the greater must be the diameter of the compression tube, and commensurately the greater the total force required to be exerted against the mass by the piston or conveyor screw forcing the extrusion of the material. Also the smaller the length of cross-sectional outline for a given bore area, the less will be the frictional resistance to extrusion, and hence the smaller will be the pressure required. Since in a practical application the diameter of the compression chamber will ordinarily be constant, because it is preferably a fixture of the apparatus generally, and the cross-sectional area and perimeter of the bore of the die are variable as moldings of different types and sizes are to be extruded, corresponding changes must be made in pressure exerted in forcing the extrusion in accordance with the desired extrusion speed. This aspect of the problem presents another reason for preferring a plunger type compressor over a conveyor screw type compressor, namely, that the former type offers greater latitude in the selection of extrusion pressure exerted on the material.

Turning attention now to Figures 3 and 4 specifically, wherever clear to do so the mechanical parts corresponding to parts of the device of Figure 2 are similarly designated. Thus, the compression chamber or tube is again designated as 12 and the die 14. In this case, however, high frequency dielectric heating electrodes 70 and 72 are employed in conjunction with the die, and for that reason the die is necessarily formed of dielectric material since the electrodes are external of the die. Otherwise, the mode of connecting the die to the compression chamber 12 is similar to the case of Figure 2.

Coacting with the compression chamber 12, the plunger 42 is reciprocated back and forth within it. This plunger is driven to apply extruding pressure to the mixture in such chamber by hydraulic means comprising a single-acting piston 44 and coacting cylinder 46. Fluid under pressure is supplied to the cylinder from a hydraulic system including a pressure source 48, a two-way solenoid type control valve 50, a principal supply pipe 52 leading to the cylinder 46, a pressure output pipe 54, in which is interposed a pump P, connecting the valve with the high pressure side of the source 48, and a return pipe 56 for returning liquid exhausted from the cylinder 46 and passing through the valve to the source 48 on the return stroke of the piston 44.

The supply of liquid under pressure to the cylinder 46 and the return of such liquid from it alternately in accordance with the operation of the plunger 42 is controlled automatically by switching means, comprising limit switches 58 and 60, actuable by movement of the plunger and piston, and disposed apart by a distance corresponding to the desired stroke of the plunger. Such switches are both actuated by a reciprocable rod 62 having an outturned end engageable with switch-actuating levers carried by the respective switches, which rod for convenience is connected directly to the end of piston 42 for reciprocation in a bore extending through the end flange of the cylinder 46 and the complemental flange of compression chamber 12 by which such cylinder and chamber are connected together. By the application of voltage to the terminals 64 leading to the switches and valve solenoid 50, such valve is shifted from one operative position to the other each time one of such switches is actuated.

When the plunger 42 reaches its forward limit of travel and the end of the actuating rod 62 engages the lever of switch 58, the solenoid valve 50 is energized to effect disconnection of the pipe 52 from the pressure source 54 to interrupt pressure movement of the plunger, and is connected to return pipe 56 to allow release of pressure in the end of the cylinder 46. This conditions the piston for the backstroke of plunger 42, as will later be described. The position of switch 58 thereby determines the forward limit of travel of the plunger 42 in the chamber 12. The rearward limit of travel of the plunger is determined by the position of switch 60, which, when actuated by the rod 62 operates the control valve 50 to deliver liquid under pressure to the cylinder 46 from pipe 54, to initiate the forward stroke of the piston 44 to drive the plunger 42 on its compression stroke. In Figure 4, the plunger 42 is shown in its forward limit position in solid lines, whereas the dotted lines indicate its rearward limit position.

Molding material entering the chamber 12 does so through pipe 66 connected to preferably the upper side of the chamber at a point which is located between the entrance to the die 14 and the forward limit position of plunger 42. Accordingly, by feeding material through such supply pipe into the chamber continuously, or intermittently in coordination with the movement of the plunger 42, the portion of the chamber ahead of the plunger is kept always completely filled with molding material. This is particularly true where, as in the embodiment shown, the force of the injected material itself, as it accumulates in the chamber, constitutes the motivating means for returning the plunger and its piston 44 to its rearward limit or starting position.

Pipe 66, receiving a conveyor screw 68 and being fed from an overhead hopper 10, branches laterally from the compression chamber extending toward one side of the housing of a suitable geared drive motor unit 69 driving the conveyor screw 68. This unit may operate continuously throughout successive cycles of movement of the plunger 42, or it may be stopped or reduced in speed during the forward or compression stroke of the plunger. Continuous operation of the screw 68 is preferred. Assuming the plunger 42 to be initially in its forward position, as it is depicted in Figure 4, it lies adjacent to the edge of the opening of pipe 66 remote from the entrance to the die 15, but is never far enough forward to block such opening. With the solenoid-controlled valve 50 in position to relieve the pressure of fluid in the cylinder 46, operation of the conveyor screw 68 forces material continuously into the chamber ahead of the plunger, which will gradually push the plunger rearwardly by the action of filling the chamber with material. The plunger continues its return movement until switch 60 is actuated, reversing valve 50 to initiate the forward stroke of the plunger by pressure of liquid in cylinder 46, which extrudes a new length of material through the die. At the end of such forward stroke the actuating rod 62 engages switch 58 to shift valve 50 for cutting off the supply of liquid to the cylinder 46 and connecting it to drain. The cycle repeats itself continuously and automatically.

It is to be noted that the conveyor screw 68 will encounter little difficulty in forcing fresh material into the chamber notwithstanding that the preceding stroke of the plunger might have left packed material in position to block the entrance to pipe 66, since the resilient consistency or packing qualities of the material while in the chamber and before activation allows it then to be forced away from the opening by pressure of the newly injected material. Moreover, during the forward or compression stroke of the plunger 42, the end rib section of the conveyor screw 68 will prevent the passage of compressed material out of chamber 12 into the pipe 66, thereby acting as a one-way valve causing injection of material into the compression chamber, but blocking its exit from such chamber through the pipe 66.

Upon entering the die through its flared throat, the material, then under high pressure, passes between the opposing arcuate plates 70 and 72 serving as high-frequency electrodes supplied with energy from a suitable high-frequency energy source 74. Inasmuch as the body of the die, comprising the diametrically joined semitubular sections 15, is of dielectric material, it will permit passage of a high frequency electric field through the fibrous material then in process of extrusion through the die.

Although, in theory, various die body materials of suitable dielectric and mechanical properties may be employed for the purpose, I prefer to employ steatite porcelain which is the material commonly used in spark plug bodies and in other applications wherein the considerations of heat, mechanical strain and abrasion are important. In thus heating the molding mixture by the dielectric energy losses incurred therein by the field, the binder may be partly or completely activated by the time it reaches the die exit, and upon its cooling or setting the resulting product may be handled temporarily for further curing or permanently as a final product. The frequency of operation of the energy source 74 or its particular nature is not critical. A frequency in the order of 50 megacycles is satisfactory. For purposes of controlling the amount of heat generated, the dielectric energy loss in the material may be varied by adjusting the frequency or the voltage of the energy source 74 in any conventional way.

The electrode and die structure is designed for mechanical strength and substantial uniformity in the passage of a field through the bore of the die without creating excessive electrical capacitance between the electrodes which would impose operating limits on the energy source 74. The respective electrodes have oppositely extending flanges 76 connected by bolts as a means to clamp together the semitubular sections of the die body between the electrodes. The bolts are separately insulated from the electrodes by means of the spacer sleeves 77 interengaged between the electrode flanges or ears 76 and by stepped washers or bushings received in holes in such flanges through which the bolts extend. The appreciable angle of wrap of the electrodes about the die body and their mode of attachment give general reinforcement to the die. Accurate mutual alignment of these two sections is achieved by their tongue and groove construction, as in the earlier described apparatus.

It is, of course, true that various die bore shapes may be used to obtain moldings of different forms. Whereas the circular shape shown in Figure 5 is particularly convenient for illustrative purposes, it will be understood that various and more intricate shapes, such as those shown in Figures 7, 8 and 9, may also be employed. When the aperture of the die bore is changed appreciably, it may be desirable in some instances to alter the driving force operating on the plunger 42 to secure the desired rate of extrusion, because of a difference in the degree of friction. It is particularly easy to do so when employing a hydraulic driving system of the type shown, since the result may be accomplished simply by regulating the pressure of the pressure source 48. Also if a considerably smaller die bore aperture cross sectional area is used, it may be necessary to increase the hydraulic pressure to secure even a lesser speed of extrusion plunger travel.

I claim as my invention:

1. Apparatus for manufacturing an extruded elongated synthetic lumber product of a compressed mixture of woody fibers and heat-activated binder, comprising a compression cylinder, an extrusion die mounted at the forward end of said cylinder and having a die chamber opening into said cylinder and extending lengthwise therefrom, a reciprocable piston coacting with said cylinder internally thereof, single-acting piston drive means operatively connected to said piston and operable to effect movement thereof only from a rearward position to a forward limit position spaced lengthwise of said cylinder from such rearward position, a mixture-feed conveyor tube branching from said cylinder at a point forwardly of said forward limit position movement, and conveyor means coacting with said tube and operable to press the mixture in said tube toward and into said cylinder with such force as to refill said cylinder with mixture following the forward stroke of said piston and thereby force said piston back to its rearward position.

2. Apparatus for manufacturing an extruded elongated synthetic lumber product of a compressed mixture of woody fibers and heat-activated binder, comprising a compression cylinder, an extrusion die mounted at the forward end of said cylinder and having a die chamber opening into said cylinder and extending lengthwise therefrom, a reciprocable piston coacting with said cylinder internally thereof, drive means operatively connected to said piston to effect movement thereof from a rearward position to a forward limit position spaced lengthwise of said cylinder from such rearward position, a mixture-feed conveyor tube branching from said cylinder at a point forwardly of said forward limit position of piston movement, and screw conveyor means coacting with said tube and rotating continuously to press mixture in said tube toward said cylinder while mixture is being extruded through the die by the forward stroke of said piston, and to refill said cylinder with mixture and thereby force said piston back to its rearward position.

3. The apparatus defined in claim 1, in which the single-acting piston drive means are hydraulic, hydraulic liquid pressure control means connected operatively to the hydraulic drive means, and switching mechanism coacting with the piston and operatively connected to said hydraulic liquid pressure control means, the switching mechanism being operable by movement of the piston to its respective rearward and forward limit positions to effect increase and relief of liquid pressure in the hydraulic drive means.

4. In continous extrusion apparatus for manufacturing molded articles of selected cross-sectional shapes from ligno-cellulose fibers and a suitable heat-activatable binder, an elongated extrusion die comprising a body portion of insulating material having an opening therethrough for passage of compressed mixture, and two coacting high-frequency electrode plates positioned respectively adjacent to opposite sides of said die body and operable to heat dielectrically the mixture in the die.

5. Apparatus as defined in claim 4 in which each electrode plate is by partial cylindrical shape fitted to its side of the die, the body portion of the die comprises two semi-cylindrical sections of ceramic material together forming a die tube, and flange members formed on said electrode plates, suitably insulated from each other and bolted together transversely of the line of separation of the die sections to clamp such sections together.

6. In extrusion apparatus a die having a body portion comprising two semicylindrical sections of ceramic material together forming a die tube, and means bolted together transversely of the plane of separation of the die sections to clamp such sections together.

7. Apparatus as defined in claim 6 in which the die sections are made of porcelain preferably of the steatite variety.

8. Apparatus as defined in claim 6 in which the die has an annular groove in its periphery near one end, a split locking ring lodged in such groove, an internally threaded sleeve encircling the end portion of said die having said groove and having an inwardly projecting shoulder disposed between said die groove and the adjacent die end, and a bushing slidably receiving the body of the die, thread-engaged with said sleeve and pressing the portion of said locking ring projecting from the groove against the shoulder of said sleeve to secure the die body in said sleeve and enabling dies to be readily removed from and secured to said sleeve.

9. Apparatus as defined in claim 6 in which the die sections have cooperating tongue and groove means at their interfaces extending lengthwise of the die and operable to hold such sections together in registry against transverse sliding and separation.

10. In apparatus for manufacturing molded objects by extrusion of plastic materials, a compression chamber for such materials, having therein a die opening, a piston coacting with said chamber, drive means operable to move said piston from a retracted position toward said die opening for extruding material therethrough, stop means operable to limit the forward movement of said piston by said drive means toward said die opening, and a screw conveyor opening into said chamber at a point between said die opening and said piston in its position of nearest approach to said die opening established by said stop means, and operable throughout forward movement of said piston to restrain appreciable movement through the conveyor opening of material pressed by said piston, and further operable throughout backward movement of said piston to supply material to said chamber in all positions of said piston between its forward limit position established by said stop means and its retracted position to maintain the space between said piston and said die opening always completely filled with plastic material devoid of air space.

CURT USCHMANN.

REFERENCES CITED

The following references are of record in the file of this patent:

UNITED STATES PATENTS

| Number | Name | Date |
|---|---|---|
| Re. 19,553 | Pfohl | Apr. 30, 1935 |
| 33,391 | Houston | Oct. 1, 1861 |
| 90,498 | Chapman | May 25, 1869 |
| 665,229 | Kelly | Jan. 1, 1901 |
| 1,322,081 | Ayers | Nov. 18, 1919 |
| 1,370,800 | Egerton | Mar. 8, 1921 |
| 1,401,198 | Shaw | Dec. 27, 1921 |
| 2,121,966 | Jacobson | June 28, 1938 |
| 2,143,549 | Edmonds | Jan. 10, 1939 |
| 2,156,160 | Olson | Apr. 25, 1939 |
| 2,177,658 | Kimble et al. | Oct. 31, 1939 |
| 2,194,283 | Kidd | Mar. 19, 1940 |
| 2,241,203 | Juelss et al. | May 6, 1941 |
| 2,286,501 | Narten | June 16, 1942 |
| 2,319,182 | Van der Pyl | May 11, 1943 |
| 2,332,170 | Sapp | Oct. 19, 1943 |
| 2,332,211 | Field | Oct. 19, 1943 |
| 2,359,840 | Goessling | Oct. 10, 1944 |
| 2,431,095 | Tucker | Nov. 18, 1947 |